(12) United States Patent
Takobe et al.

(10) Patent No.: US 11,772,586 B2
(45) Date of Patent: Oct. 3, 2023

(54) LINEAR POWER SUPPLY CIRCUIT

(71) Applicant: ROHM CO., LTD., Kyoto (JP)

(72) Inventors: Isao Takobe, Kyoto (JP); Yuhei Yamaguchi, Kyoto (JP); Tetsuo Tateishi, Kyoto (JP); Takeshi Nagata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/724,733

(22) Filed: Apr. 20, 2022

(65) Prior Publication Data

US 2022/0242340 A1    Aug. 4, 2022

Related U.S. Application Data (63) Continuation of application No. 17/286,850, filed as application No. PCT/JP2019/041712 on Oct. 24, 2019, now Pat. No. 11,338,747.

(30) Foreign Application Priority Data

Oct. 31, 2018 (JP) .................................. 2018205467
Oct. 31, 2018 (JP) .................................. 2018205816

(51) Int. Cl.
  *G05F 1/575*    (2006.01)
  *B60R 16/03*    (2006.01)
  *G05F 1/59*     (2006.01)
(52) U.S. Cl.
  CPC .............. *B60R 16/03* (2013.01); *G05F 1/575* (2013.01); *G05F 1/59* (2013.01)
(58) Field of Classification Search
  None
  See application file for complete search history.

(56) References Cited

U.S. PATENT DOCUMENTS 5,491,401 A    2/1996 Inoue et al.
6,369,554 B1   4/2002 Aram
(Continued)

FOREIGN PATENT DOCUMENTS

CN    101364119    2/2009
CN    102306482    1/2012
(Continued)

OTHER PUBLICATIONS

PCT International Search Report in International Appln. No. PCT/JP2019/041712, dated Jan. 21, 2020, 4 pages (with English Translation).

*Primary Examiner* — Jeffery S Zweizig
(74) *Attorney, Agent, or Firm* — Fish & Richardson P.C.

(57) ABSTRACT

A linear power supply circuit according to the present invention is provided with: an output transistor provided between an input end to which an input voltage is applied and an output end to which an output voltage is applied; and a driver for driving the output transistor on the basis of the difference between a voltage based on the output voltage and a reference voltage. The driver is provided with: a differential amplifier for outputting a voltage according to the difference between the voltage based on the output voltage and the reference voltage; a capacitor one end of which has an output of the differential amplifier applied thereto and the other end of which has the voltage based on the output voltage applied thereto; a converter for converting a voltage based on the output of the differential amplifier into an electrical current and outputting the electrical current; and an electrical current amplifier for amplifying the electrical current of the output of the converter. The supply voltage of the differential amplifier is a first constant voltage or the input voltage.

12 Claims, 9 Drawing Sheets

(56) References Cited

U.S. PATENT DOCUMENTS

| | | | |
|---|---|---|---|
| 6,677,735 B2 | 1/2004 | Xi | |
| 9,003,500 B2* | 4/2015 | Oglesbee | H04L 67/125 707/610 |
| 9,274,534 B2 | 3/2016 | Fang et al. | |
| 10,310,530 B1 | 6/2019 | Lu et al. | |
| 11,061,422 B2 | 7/2021 | Jin | |
| 11,068,003 B2 | 7/2021 | Takobe et al. | |
| 11,209,851 B2 | 12/2021 | Nagata et al. | |
| 11,550,349 B2* | 1/2023 | Takobe | G05F 1/575 |
| 2006/0164053 A1 | 7/2006 | Walter et al. | |
| 2010/0201283 A1 | 8/2010 | Kawata et al. | |
| 2012/0146599 A1 | 6/2012 | Oyama | |
| 2013/0069554 A1 | 3/2013 | Kawata et al. | |
| 2014/0015433 A1 | 1/2014 | Kawata et al. | |
| 2014/0333280 A1 | 11/2014 | Kawata et al. | |
| 2015/0311790 A1 | 10/2015 | Kawata et al. | |
| 2016/0218627 A1 | 7/2016 | Dikken et al. | |
| 2017/0205841 A1 | 7/2017 | Jefremow et al. | |
| 2017/0351285 A1 | 12/2017 | Iwata et al. | |
| 2018/0131341 A1 | 5/2018 | Nallamothu | |
| 2019/0097533 A1 | 3/2019 | Kawata et al. | |
| 2021/0152085 A1 | 5/2021 | Kawata et al. | |
| 2021/0380053 A1 | 12/2021 | Takobe et al. | |
| 2021/0391789 A1 | 12/2021 | Kawata et al. | |

FOREIGN PATENT DOCUMENTS

| | | |
|---|---|---|
| CN | 102541142 | 7/2012 |
| CN | 105827116 | 8/2016 |
| CN | 108075766 | 5/2018 |
| DE | 10213515 A1 | 12/2003 |
| DE | 102016200390 A1 | 7/2017 |
| JP | S60-170821 | 11/1985 |
| JP | H02150912 | 6/1990 |
| JP | H07121252 | 5/1995 |
| JP | 2003084843 | 3/2003 |
| JP | 2005339467 | 12/2005 |
| JP | 2010277226 | 12/2010 |
| JP | 2016015076 | 1/2016 |
| JP | 2016143394 | 8/2016 |

* cited by examiner

LINEAR POWER SUPPLY CIRCUIT

CROSS REFERENCE TO RELATED APPLICATIONS

This application is a Continuation of U.S. patent application Ser. No. 17/286,850, filed Apr. 20, 2021, which is a U.S. National Phase application under 35 U.S.C. § 371 of International Patent Application No. PCT/JP2019/041712, filed on Oct. 24, 2019, which claims the priority to Japanese Patent Application Nos. 2018-205467, filed on Oct. 31, 2018 and 2018-205816, filed Oct. 31, 2018, the disclosures of which are incorporated herein by reference in their entirety.

TECHNICAL FIELD

The present invention relates to linear power supply circuits.

BACKGROUND ART

Linear power supply circuits, such as those of an LDO (low drop-out) type, are used as a means of power supply in a variety of devices.

One example of known technology related to what has just been mentioned is seen in Patent Document 1 identified below.

CITATION LIST

Patent Literature

Patent Document 1: Japanese unexamined patent application publication No. 2003-84843

SUMMARY OF INVENTION

Technical Problem

Linear power supply circuits are desired to be capable of fast response so that they can cope with abrupt changes in the load with small variations in the output voltage. The output voltage of a linear power supply circuit needs to be set at a value that suits the device in which it is incorporated; thus linear power supply circuits are sometimes adapted to yield low voltages (e.g., 1 V or lower) and are other times adapted to yield high voltages (e.g., 5 V or higher).

In view of what is discussed above, a first object of the present invention is to provide a linear power supply circuit that operates properly with fast response when adapted for a low output voltage.

In view of what is discussed above, a second object of the present invention is to provide a linear power supply circuit that operates properly with fast response when adapted for a high output voltage.

Solution to Problem

To achieve the first object mentioned above, according to one aspect of the present invention, a linear power supply circuit includes: an output transistor provided between an input terminal to which an input voltage is applied and an output terminal to which an output voltage is applied; and a driver configured to drive the output transistor based on the difference between a voltage based on the output voltage and a reference voltage. The driver includes: a differential amplifier configured to output a voltage commensurate with the difference between the voltage based on the output voltage and the reference voltage; a capacitor of which one terminal is fed with the output of the differential amplifier and of which the other terminal is fed with the voltage based on the output voltage; a converter configured to convert the voltage based on the output of the differential amplifier into a current to output the current; and a current amplifier configured to perform current amplification on an output of the converter. The supply voltage for the differential amplifier is a first constant voltage or the input voltage. (A first configuration.)

In the linear power supply circuit according to the first configuration described above, the supply voltage for the differential amplifier may be the first constant voltage, and the supply voltage for the current amplifier may be a second constant voltage. (A second configuration.)

In the linear power supply circuit according to the first or second configuration described above, the differential amplifier and the converter may have a withstand voltage higher than the output voltage. (A third configuration.)

In the linear power supply circuit according to the first configuration described above, the supply voltage for the differential amplifier and the supply voltage for the current amplifier may be the input voltage. (A fourth configuration.)

In the linear power supply circuit according to the fourth configuration described above, the differential amplifier and the converter may have a withstand voltage lower than the withstand voltage of the current amplifier. (A fifth configuration.)

In the linear power supply circuit according to any of the first to fifth configurations described above, the differential amplifier may have a gain lower than the gain of the current amplifier. (A sixth configuration.)

In the linear power supply circuit according to any of the first to sixth configurations described above, the current amplifier may include a plurality of current-sink current mirror circuits and a plurality of current-source current mirror circuits. The current-sink current mirror circuits may each have a mirror ratio of 5 or less. The current-source current mirror circuits may each have a mirror ratio of 5 or less. (A seventh configuration.)

In the linear power supply circuit according to any of the first to seventh configurations described above, the converter may be an NMOSFET or an NPN transistor. (An eighth configuration.)

In the linear power supply circuit according to the eighth configuration described above, the differential amplifier may include differential pair transistors composed of PMOSFETs or PNP transistors. (A ninth configuration.)

According to another aspect of the present invention, a vehicle includes a linear power supply circuit according to any of the first to ninth configurations described above. (A tenth configuration.)

To achieve the second object mentioned above, according to yet another aspect of the present invention, a linear power supply circuit includes: an output transistor provided between an input terminal to which an input voltage is applied and an output terminal to which an output voltage is applied; and a driver configured to drive the output transistor based on a division voltage of the output voltage and a reference voltage. The driver includes: a differential amplifier configured to output a voltage commensurate with the difference between the division voltage and the reference voltage; a capacitor of which one terminal is fed with the output of the differential amplifier and of which the other terminal is fed with the ground potential; a converter configured to convert the voltage based on the output of the differential amplifier into a current to output the current; and a current amplifier configured to perform current amplification on the output of the converter. The supply voltage for the differential amplifier and the converter is a voltage that is lower than the output voltage and that depends on the output voltage. (An eleventh configuration.)

In the linear power supply circuit according to the eleventh configuration described above, the division voltage may be lower than the supply voltage for the differential amplifier and the converter. (A twelfth configuration.)

In the linear power supply circuit according to the eleventh or twelfth configuration described above, the differential amplifier and the converter may have a withstand voltage lower than the output voltage. (A thirteenth configuration.)

In the linear power supply circuit according to any of the eleventh to thirteenth configurations described above, the supply voltage for the current amplifier may be a constant voltage. (A fourteenth configuration.)

In the linear power supply circuit according to the fourteenth configuration described above, the differential amplifier and the converter may have a withstand voltage lower than the withstand voltage of the current amplifier. (A fifteenth configuration.)

In the linear power supply circuit according to any of the eleventh to fifteenth configurations described above, the differential amplifier may have a gain lower than the gain of the current amplifier. (A sixteenth configuration.)

In the linear power supply circuit according to any of the eleventh to sixteenth configurations described above, the current amplifier may include a plurality of current-sink current mirror circuits and a plurality of current-source current mirror circuits. The current-sink current mirror circuits may each have a mirror ratio of 5 or less. The current-source current mirror circuits may each have a mirror ratio of 5 or less. (A seventeenth configuration.)

The linear power supply circuit according to any of the eleventh to seventeenth configurations described above may further include a generator configured to generate the supply voltage for the differential amplifier and the converter from the output voltage. The generator may include a high-impedance-input element. (An eighteenth configuration.)

In the linear power supply circuit according to the eighteenth configuration described above, the element may have a withstand voltage equal to or higher than the output voltage, and the part of the generator except the element may have a withstand voltage lower than the output voltage. (A nineteenth configuration.)

The linear power supply circuit according to any of the eleventh to nineteenth configurations described above may further include a feedback circuit configured to feed back, to the current amplifier, information on the output current output from the output terminal. The driver may be configured to drive the output transistor based on the difference between the division voltage of the output terminal and the reference voltage as well as based on the information. The feedback circuit may be configured to feed the information back to a first predetermined point across a first path from the output of the differential amplifier to the output terminal and to acquire the information from a second predetermined point across a second path from the input of the current amplifier to the output terminal. The second predetermined point may be located closer, than the first predetermined point, to the output terminal. The current amplifier may include a plurality of current-sink current mirror circuits and a plurality of current-source current mirror circuits. The input of one of the current-sink current mirror circuits may be the first predetermined point. The feedback circuit may be configured to draw from the first predetermined point a current commensurate with the information. The sum current of the current drawn from the first predetermined point by the feedback circuit and the current drawn from the first predetermined point by the current-sink current mirror circuit of which the input is the first predetermined point may have a maximum value that does not depend on the output of the converter. (A twentieth configuration.)

According to still another aspect of the present invention, a vehicle includes a linear power supply circuit according to any of the eleventh to twentieth configurations described above. (A twenty-first configuration.)

Advantageous Effects of Invention

According to one aspect of the present invention, it is possible to provide a linear power supply circuit that operates properly with fast response when adapted for a low output voltage.

According to another aspect of the present invention, it is possible to provide a linear power supply circuit that operates properly with fast response when adapted for a high output voltage.

DESCRIPTION OF EMBODIMENTS

1. Linear Power Supply Circuit Capable of Fast Response

Figure 1:
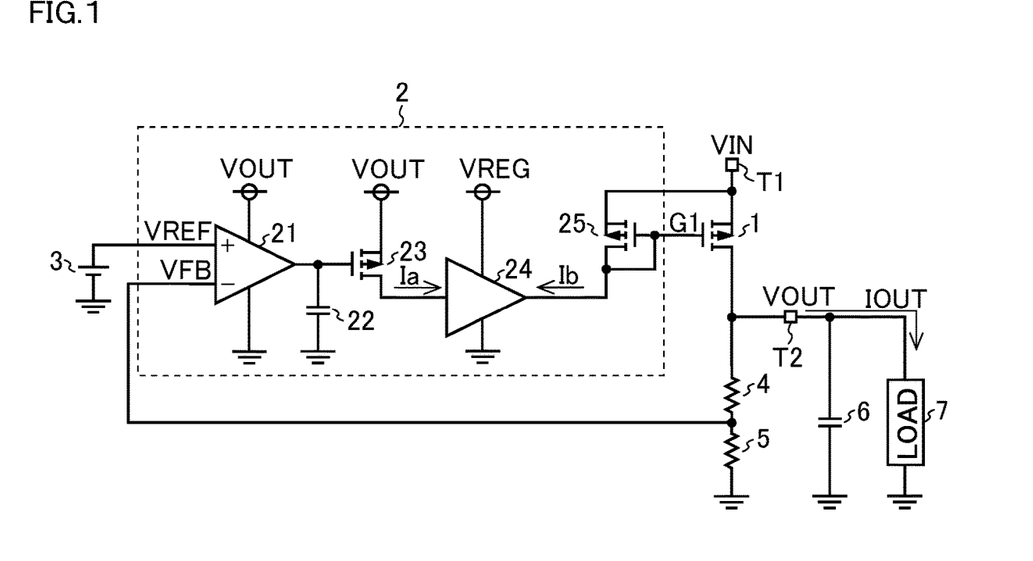
FIG. 1 is a diagram showing the configuration of a linear power supply circuit developed by the present inventors.

FIG. 1 is a diagram showing the configuration of a linear power supply circuit that the present inventors have developed as a linear power supply circuit capable of fast response. The linear power supply circuit shown in FIG. 1 includes an input terminal T1, an output terminal T2, an output transistor 1, a driver 2, a reference voltage generator 3, and resistors 4 and 5.

To the linear power supply circuit shown in FIG. 1, an output capacitor 6 and a load 7 are externally connected. Specifically, the output capacitor 6 and the load 7 are, in parallel with each other, connected externally to the output terminal T2. The linear power supply circuit shown in FIG. 1 busts (steps down) an input voltage VIN to generate an output voltage VOUT, and supplies it to the load 7.

The output transistor 1 is provided between the input terminal T1, to which the input voltage VIN is applied, and the output terminal T2, to which the output voltage VOUT is applied.

The driver 2 drives the output transistor 1. Specifically, the driver 2 feeds a gate signal G1 to the gate of the output transistor 1 to drive the output transistor 1. The conductivity (in inverse terms, the on-resistance value) of the output transistor 1 is controlled by the gate signal G1. In the configuration shown in FIG. 1, a PMOSFET (p-channel MOSFET) is used as the output transistor 1. Thus, the lower the gate signal G1, the higher the conductivity of the output transistor 1, and thus the higher the output voltage VOUT. By contrast, the higher the gate signal G1, the lower the conductivity of the output transistor 1, and thus the lower the output voltage VOUT. Here, as the output transistor 1, an NMOSFET or a bipolar transistor may be used in place of the PMOSFET.

The reference voltage generator 3 generates a reference voltage VREF. The resistors 4 and 5 generate a feedback voltage VFB, which is a division voltage of the output voltage VOUT.

The non-inverting input terminal (+) of the driver 2 is fed with the feedback voltage VFB, and the inverting input terminal (−) of the driver 2 is fed with the reference voltage VREF. The driver 2 drives the output transistor 1 based on the difference value ΔV (=VFB−VREF) between the feedback voltage VFB and the reference voltage VREF. The larger the difference value ΔV, the higher the driver 2 makes the gate signal G1; the smaller the difference value ΔV, the lower the driver 2 makes the gate signal G1.

The driver 2 includes a differential amplifier 21, a capacitor 22, a PMOSFET 23, a current amplifier 24, and a PMOSFET 25.

The differential amplifier 21 outputs a voltage commensurate with the difference between the feedback voltage VFB and the reference voltage VREF. The supply voltage for the differential amplifier 21 is the output voltage VOUT. That is, the differential amplifier 21 is driven by the voltage between the output voltage VOUT and the ground potential.

The withstand voltage of the differential amplifier 21 is lower than the withstand voltage of the current amplifier 24. The gain of the differential amplifier 21 is lower than the gain of the current amplifier 24. This helps make the differential amplifier 21 compact.

One terminal of the capacitor 22 is fed with the output of the differential amplifier 21, and the other terminal of the capacitor 22 is fed with the ground potential.

The source of the PMOSFET 23 is fed with the output voltage VOUT, and the gate of the PMOSFET 23 is fed with a voltage based on the output of the differential amplifier 21 (i.e., the voltage at the connection node between the differential amplifier 21 and the capacitor 22). The PMOSFET 23 converts the voltage based on the output of the differential amplifier 21 into a current, which the PMOSFET 23 outputs from its drain. The connection node between the differential amplifier 21 and the capacitor 22 serves as a negative ground in a high-frequency band, and this helps achieve fast response of the driver 2.

The current amplifier 24 performs current amplification on the current Ia output from the drain of the PMOSFET 23. The supply voltage for the current amplifier 24 is a constant voltage VREG. That is, the current amplifier 24 is driven by the voltage between the constant voltage VREG and the ground potential.

The PMOSFET 25 together with the output transistor 1 constitutes a current mirror circuit. The PMOSFET 25 converts the current Ib output from the current amplifier 24 into a voltage, which the PMOSFET 25 feeds to the gate of the output transistor 1.

Figure 2:
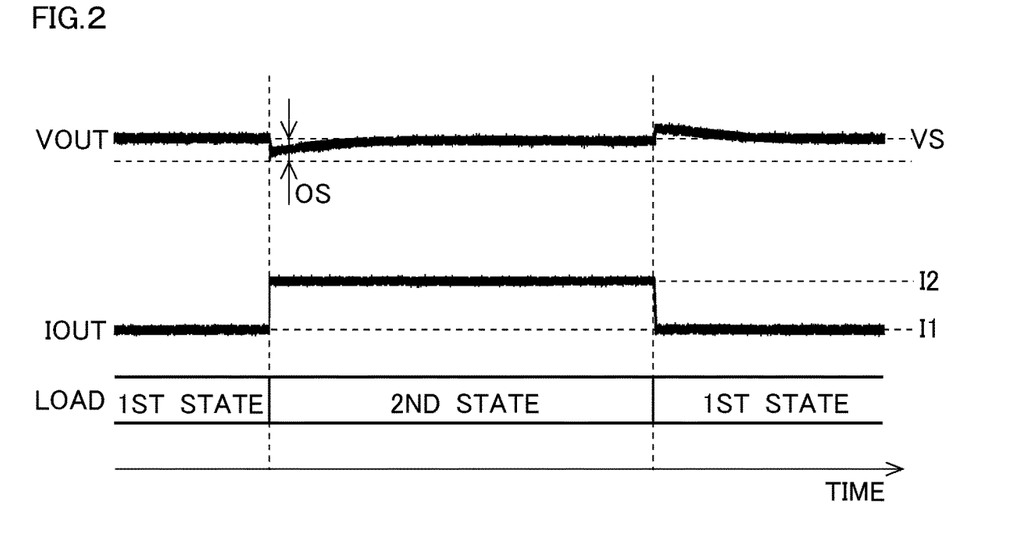
FIG. 2 is a timing chart showing the output characteristics of the linear power supply circuit shown in FIG. 1.

FIG. 2 is a timing chart showing the output characteristics of the linear power supply circuit shown in FIG. 1. The timing chart of FIG. 2 shows what is observed when, in a state where the output capacitor 6 has a predetermined capacitance value and the output voltage VOUT is set at a value VS, the load 7 is switched from a first state to a second state and is then switched back to the first state. The first state is a light-load state where the output current IOUT has a theoretical value I1, and the second state is a heavy-load state where the output current IOUT has a theoretical value I2 (>I1).

The linear power supply circuit shown in FIG. 1 is capable of fast response, and this helps reduce an overshoot OS. However, in the linear power supply circuit shown in FIG. 1, the output voltage VOUT is used as the supply voltage for the differential amplifier 21. Thus, adaptation for a low output voltage VOUT (e.g., 1 V or lower) makes it impossible for the differential amplifier 21 to operate. This is the first problem.

Moreover, the linear power supply circuit shown in FIG. 1 requires that the withstand voltage of the differential amplifier 21 be equal to or higher than the output voltage VOUT. Thus, adaptation for a high voltage (e.g., 5 V or higher) leads to an increased withstand voltage of the differential amplifier 21 and hence an increased circuit area of the differential amplifier 21. This produces a delay in the response time of the differential amplifier 21 and degrades the response of the linear power supply circuit shown in FIG. 1. This is the second problem.

2. First Embodiment

Figure 3:
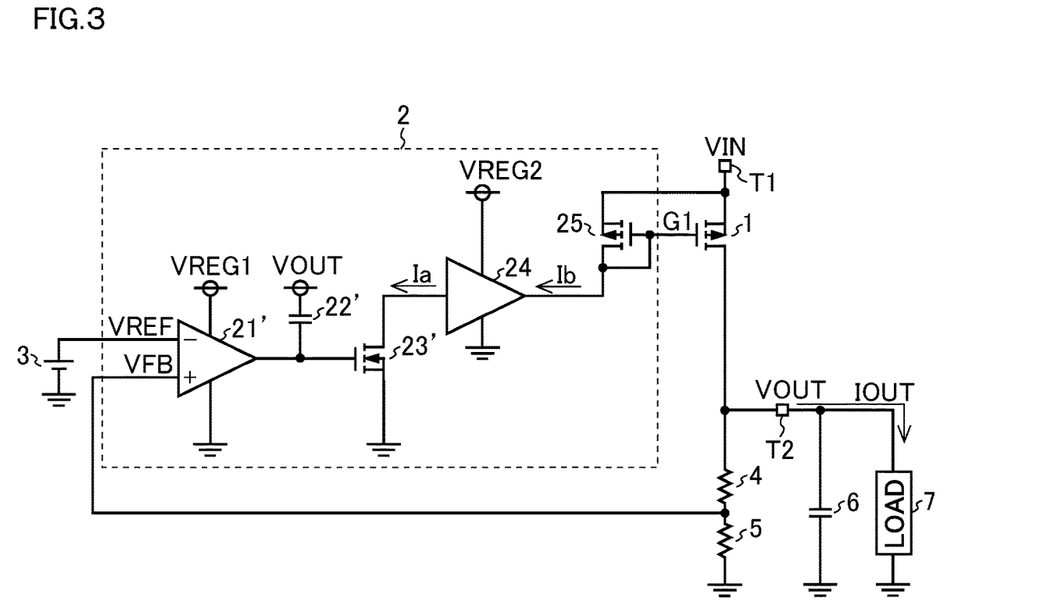
FIG. 3 is a diagram showing the configuration of a linear power supply circuit according to a first embodiment.

FIG. 3 is a diagram showing the configuration of a linear power supply circuit according to a first embodiment. The linear power supply circuit shown in FIG. 3 is one example of a linear power supply circuit that the present inventors have developed to solve the first problem of the linear power supply circuit shown in FIG. 1. In FIG. 3, such parts as find their counterparts in FIG. 1 are identified by common reference signs, and no overlapping description will be repeated.

The linear power supply circuit shown in FIG. 3 differs from the linear power supply circuit shown in FIG. 1 in that it includes—in place of the differential amplifier 21, the capacitor 22, and the PMOSFET 23—a differential amplifier 21', a capacitor 22', and a NMOSFET 23'. An NPN transistor may be used in place of the NMOSFET 23'.

The differential amplifier 21' outputs a voltage commensurate with the difference between the feedback voltage VFB and the reference voltage VREF. If, however, the output voltage VOUT falls within the input dynamic range of the differential amplifier 21', the resistors 4 and 5 may be omitted, in which case the output voltage VOUT itself can be used as the feedback voltage VFB so that the output voltage VOUT is directly fed to the differential amplifier 21'.

Figure 4:
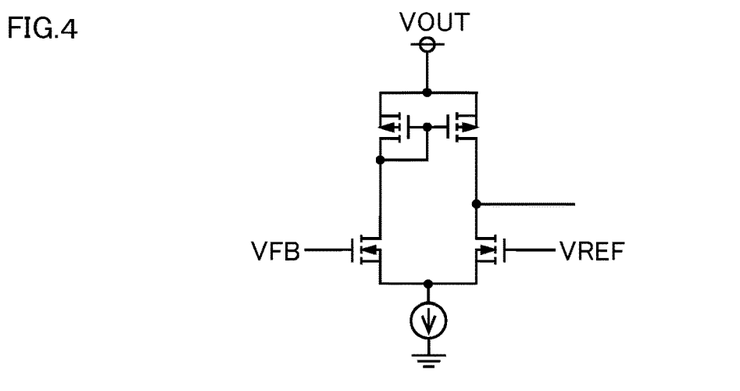
FIG. 4 is a diagram showing one configuration example of a differential amplifier used in the linear power supply circuit shown in FIG. 1.
Figure 5:
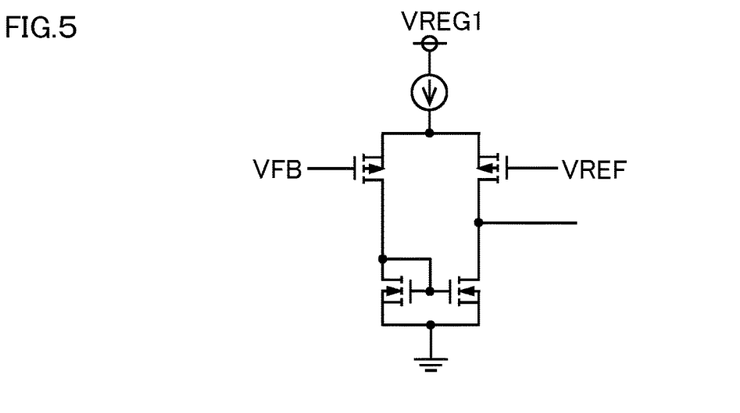
FIG. 5 is a diagram showing one configuration example of a differential amplifier used in the linear power supply circuit shown in FIG. 3.

The supply voltage for the differential amplifier 21' is a first constant voltage VREG1. That is, the differential amplifier 21' is driven by the voltage between the first constant voltage VREG1 and the ground potential. Whereas the differential amplifier 21 used in the linear power supply circuit shown in FIG. 1 includes, for example as shown in FIG. 4, NMOSFETs as differential pair transistors, the differential amplifier 21' used in the linear power supply circuit shown in FIG. 3 includes, for example as shown in FIG. 5, PMOSFETs as differential pair transistors. In the differential amplifier 21', instead of PMOSFETs, PNP transistors may be used as differential pair transistors. The differential amplifier 21' however is not limited to an amplifier that includes PMOSFETs or PNP transistors as differential pair transistors. For example, an amplifier of a folded cascode type that includes NMOSFETs or NPN transistors as differential pair transistors can be used as the differential amplifier 21'.

One terminal of the capacitor 22' is fed with the output of the differential amplifier 21', and the other terminal of the capacitor 22' is fed with the output voltage VOUT. Instead of the output voltage VOUT, a voltage that depends on the output voltage VOUT may be fed to the other terminal of the capacitor 22'.

The drain of the NMOSFET 23' is fed with a second constant voltage VREG2, and the gate of the NMOSFET 23' is fed with a voltage based on the output of the differential amplifier 21' (i.e., the voltage at the connection node between the differential amplifier 21' and the capacitor 22'). The NMOSFET 23' converts the voltage based on the output of the differential amplifier 21' into a current, which the NMOSFET 23' outputs from its source. The connection node between the differential amplifier 21' and the capacitor 22' serves as an output voltage VOUT-ground (positive ground) in a high-frequency band, and this helps achieve fast response of the driver 2.

The first and second constant voltages VREG1 and VREG2 may have the same value, or may have different values.

The linear power supply circuit shown in FIG. 3 provides effects similar to those offered by the linear power supply circuit shown in FIG. 1. In addition, the linear power supply circuit shown in FIG. 3 ensures proper operation of the differential amplifier 21' in a case where the output voltage VOUT is set at a low value. That is, the linear power supply circuit shown in FIG. 3 operates properly with fast response when adapted for a low output voltage VOUT (e.g., 1 V or lower). Accordingly, for example, the linear power supply circuit shown in FIG. 3 can be adapted for a low output voltage (e.g., 1 V or lower) such that the first and second constant voltages VREG1 and VREG2 are higher than the output voltage VOUT, that the withstand voltage of the differential amplifier 21' is equal to or higher than the first constant voltage VREG1, and that the withstand voltage of the NMOSFET 23' is equal to or higher than the second constant voltage VREG2.

The withstand voltage of the differential amplifier 21' is lower than the withstand voltage of the current amplifier 24. The gain of the differential amplifier 21' is lower than the gain of the current amplifier 24. This helps make the differential amplifier 21' compact.

The withstand voltage of the NMOSFET 23' is lower than the withstand voltage of the current amplifier 24. This helps make the NMOSFET 23' compact.

3. Configuration Example

Figure 6:
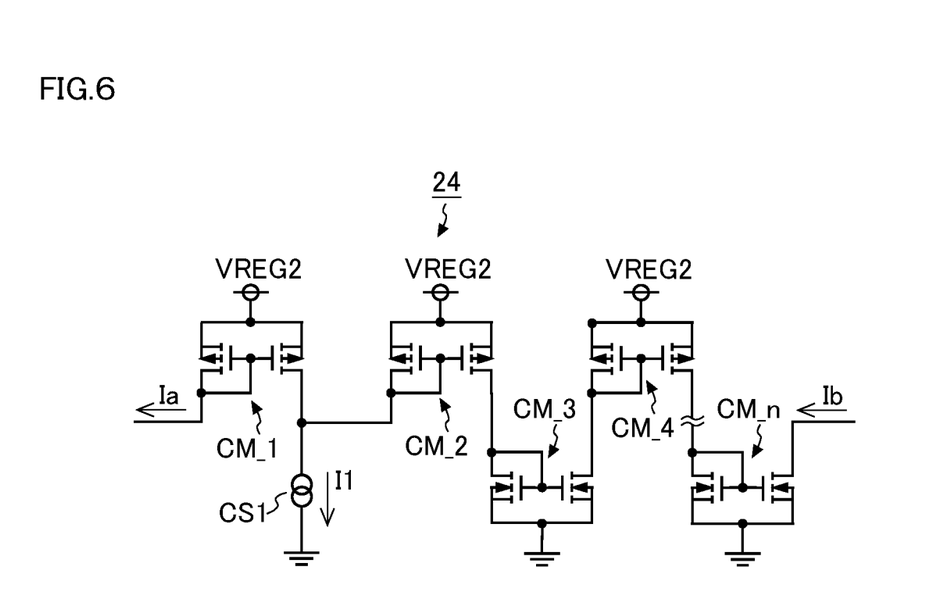
FIG. 6 is a diagram showing one configuration example of a current amplifier used in the linear power supply circuit shown in FIG. 3.

FIG. 6 is a diagram showing one configuration example of the current amplifier 24 used in the linear power supply circuit shown in FIG. 3. The current amplifier 24 includes current-source current mirror circuits CM_1, CM_2, CM_4, . . . CM_n−1 (though CM_n−1 is not illustrated in FIG. 6) and current-sink current mirror circuits CM_3, . . . CM_n. Between, at one end, the current-source current mirror circuit CM_1 and a constant current source CS1 that produces a constant current I1 and, at the other end, the current-sink current mirror circuit CM_n, from the input to the output of the current amplifier 24, the current-source current mirror circuits and the current-sink current mirror circuits are arranged alternately. To keep poles occurring in the current mirror circuits as far away as possible from a low-frequency band, the current mirror circuits are preferably each given a mirror ratio (the ratio of the size of the output-side transistor to the size of the input-side transistor) of 5 or less, and more preferably 3 or less. Considering however that, the lower the mirror ratio of a current mirror circuit, the larger the circuit area of the current amplifier 24, the current mirror circuits can each be given a mirror ratio determined with consideration given to the trade off between improved frequency characteristics and compactness.

Figure 7A:
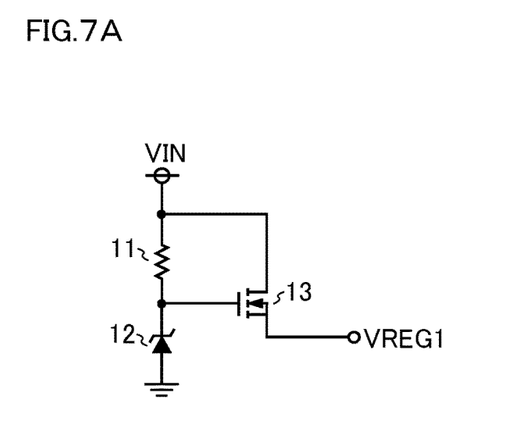
FIG. 7A is a diagram showing one configuration example of a constant voltage generation circuit.

FIG. 7A is a diagram showing one configuration example of the constant voltage generation circuit that generates the first constant voltage VREG1. The constant voltage generation circuit shown in FIG. 7A includes a resistor 11, a Zener diode 12, and an NMOSFET 13. The first constant voltage VREG1 generated by the constant voltage generation circuit shown in FIG. 7A has a value resulting from subtracting the gate-source voltage of the NMOSFET 13 from the Zener voltage of the Zener diode 12. Instead of the NMOSFET 13, an NPN transistor may be used. The constant voltage generation circuit that generates the second constant voltage VREG2 can be configured similarly to the constant voltage generation circuit that generates the first constant voltage VREG1. Any parts that can be shared between the constant voltage generation circuits that generate the first and second constant voltages VREG1 and VREG2 respectively are preferably shared between them. In a case where the first and second constant voltages VREG1 and VREG2 has the same value, they both can be generated by a single constant voltage generation circuit.

Figure 7B:
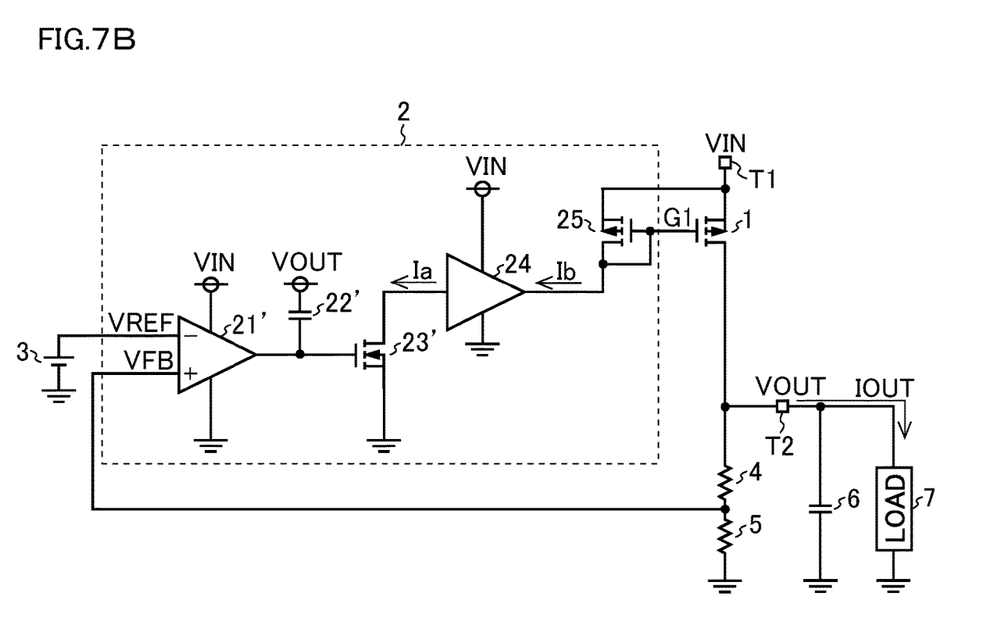
FIG. 7B is a diagram showing a modified example of the linear power supply circuit shown in FIG. 3.

The constant voltage generation circuit mentioned above is preferably provided within the linear power supply circuit shown in FIG. 3. Instead, the linear power supply circuit shown in FIG. 3 may be provided with a constant voltage input terminal so that the first and second constant voltages VREG1 and VREG2 are fed to the linear power supply circuit shown in FIG. 3 from outside it. In a case where the input voltage VIN is a low voltage, for example as shown in FIG. 7B, instead of the first constant voltage VREG1, the input voltage VIN can be used as the supply voltage for the differential amplifier 21', and instead of the second constant voltage VREG2, the input voltage VIN can be used as the supply voltage for the current amplifier 24. In that case, no constant voltage generation circuits are needed to generate either of the first and second constant voltages VREG1 and VREG2.

4. One Embodiment

Figure 8:
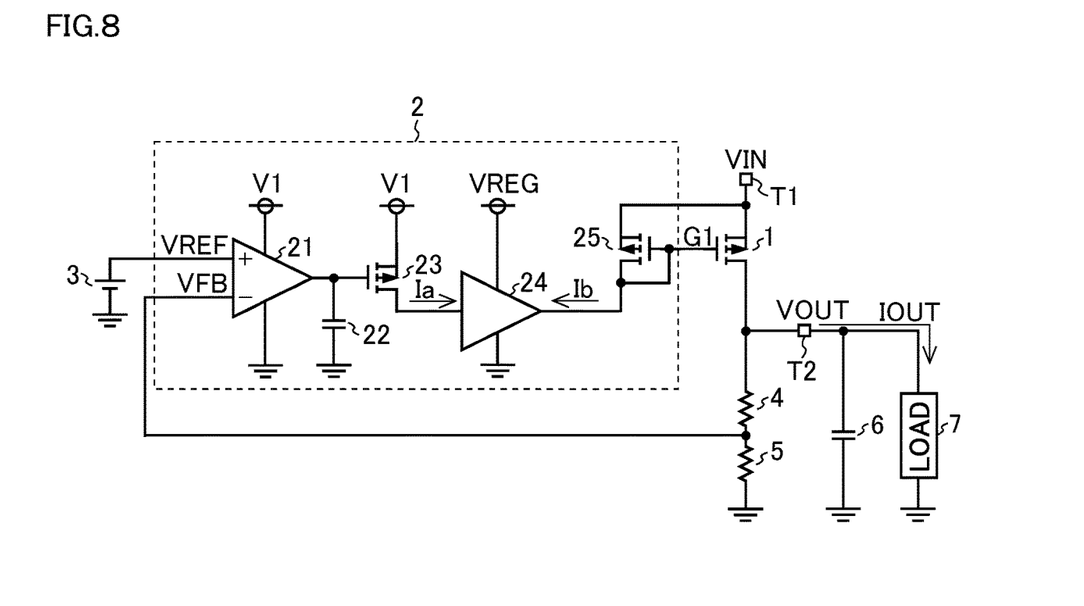
FIG. 8 is a diagram showing the configuration of a linear power supply circuit according to a second embodiment.

FIG. 8 is a diagram showing the configuration of a linear power supply circuit according to a second embodiment. The linear power supply circuit shown in FIG. 8 is one example of a linear power supply circuit that the present inventors have developed to solve the second problem of the linear power supply circuit shown in FIG. 1. In FIG. 8 such parts as find their counterparts in FIG. 1 are identified by common reference signs, and no overlapping description will be repeated.

The linear power supply circuit shown in FIG. 8 differs from the linear power supply circuit shown in FIG. 1 in that the supply voltage for the differential amplifier 21 and the voltage fed to the source of the PMOSFET 23 are both not the output voltage VOUT but a voltage V1. The voltage V1 is a voltage that is lower than the output voltage VOUT and that depends on the output voltage VOUT.

In the linear power supply circuit shown in FIG. 8, as in the linear power supply circuit shown in FIG. 1, the connection node between the differential amplifier 21 and the capacitor 22 serves as a negative ground in a high-frequency band, and this helps achieve fast response of the driver 2.

In the linear power supply circuit shown in FIG. 8, as described above, the supply voltage for the differential amplifier 21 is the voltage V1. Moreover, the feedback voltage VFB is lower than the voltage V1. Accordingly, in the linear power supply circuit shown in FIG. 8, the withstand voltage of the differential amplifier 21 does not need to be higher than the output voltage VOUT, and only needs to be equal to or higher than the voltage V1. Thus, adaptation for a high output voltage VOUT (e.g., 5 V or higher) does not require an increased withstand voltage in the differential amplifier 21. Accordingly, the differential amplifier 21 and the PMOSFET 23 can be given a withstand voltage equal to or higher than the voltage V1 but lower than the output voltage VOUT.

With the linear power supply circuit shown in FIG. 8, when it is adapted for a high output voltage (e.g., 5 V or higher), it is possible to suppress an increase in the withstand voltage (an increase in the circuit area) of the differential amplifier 21, and thus to achieve fast response.

The withstand voltage of the differential amplifier 21 is lower than the withstand voltage of the current amplifier 24. The gain of the differential amplifier 21 is lower than the gain of the current amplifier 24. This helps make the differential amplifier 21 compact.

The withstand voltage of the PMOSFET 23 is lower than the withstand voltage of the current amplifier 24. This helps make the PMOSFET 23 compact.

5. Configuration Example

Figure 9A:
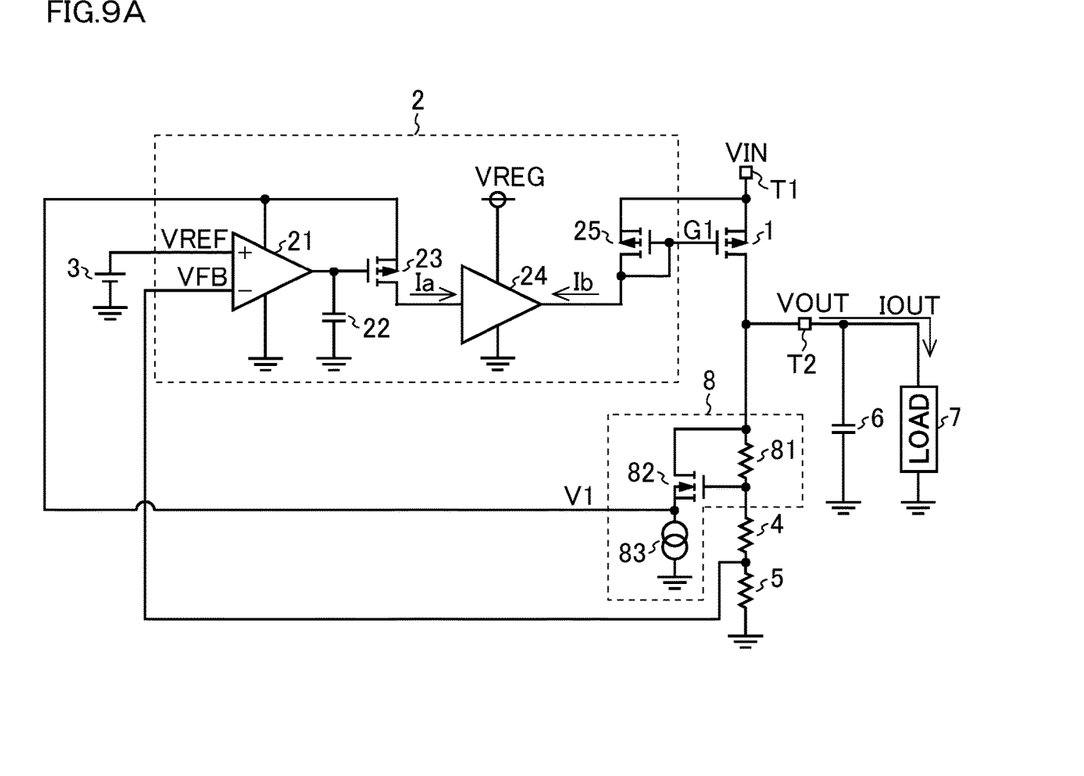
FIG. 9A is a diagram showing one configuration example of the linear power supply circuit shown in FIG. 8.

FIG. 9A is a diagram showing one configuration example of the linear power supply circuit shown in FIG. 8. In FIG. 9A, such parts as find their counterparts in FIG. 8 are identified by common reference signs, and no overlapping description will be repeated.

In this configuration example, the linear power supply circuit includes a generator 8 that generates the voltage V1. The generator 8 includes a resistor 81, an NMOSFET 82, and a current source 83. One terminal of the resistor 81 and the drain of the NMOSFET 82 are connected to the output terminal T2. The other terminal of the resistor 81 and the gate of the NMOSFET 82 are connected to the resistor 4. The source of the NMOSFET 82 is connected via the current source 83 to the ground potential. The voltage at the connection node between the NMOSFET 82 and the current source 83 is the voltage V1.

The resistor 81 in the generator 8 is involved also in the generation of the feedback voltage VFB. In the linear power supply circuit shown in FIG. 9A, the resistors 81, 4, and 5 produces the feedback voltage VFB. Since the voltage V1 is the supply voltage for the differential amplifier 1 and the PMOSFET 23, the generator 8 serves to supply the differential amplifier 1 and the PMOSFET 23 with a supply current. Owing to the NMOSFET 82 being a high-impedance-input element (i.e. an element of which the input impedance can be regarded as ∞ [infinite] in terms of resistance value), providing the NMOSFET 82 helps prevent unnecessary power consumption in the resistor 81. The circuit constants of the generator 8 and the resistors 4 and 5 can be set, for example, such that the value of the current through the resistors 81, 4, and 5 is substantially equal to the value of the current through the current source 83.

In the generator 8, the NMOSFET 82 is preferably given a withstand voltage equal to or higher than the output voltage VOUT and the part of the generator 8 (i.e., the resistor 81 and the current source 83) except the NMOSFET 82 is preferably given a withstand voltage lower than the output voltage VOUT. This helps make the generator 8 compact.

Figure 9B:
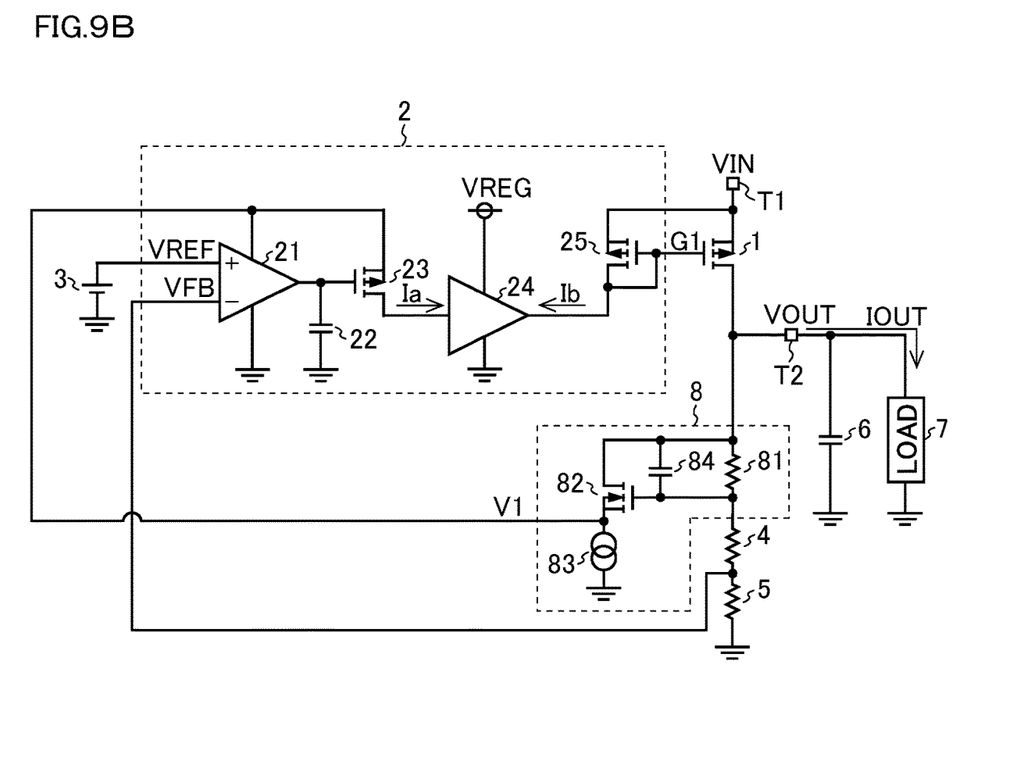
FIG. 9B is a diagram showing another configuration example of the linear power supply circuit shown in FIG. 8.

FIG. 9B is a diagram showing another configuration example of the linear power supply circuit shown in FIG. 8. In FIG. 9B, such parts as find their counterparts in FIG. 9A are identified by common reference signs, and no overlapping description will be repeated. In this configuration example, the generator 8 includes—in addition to the resistor 81, the NMOSFET 82, and the current source 83—a capacitor 84. The capacitor 84 is provided between the gate and the source of the NMOSFET 82. As in the configuration example shown in FIG. 9A, also in this configuration example, the part of the generator 8 (the resistor 81, the current source 83, and the capacitor 84) except the NMOSFET 82 is preferably given a withstand voltage lower than the output voltage VOUT. This helps make the generator 8 compact.

Figure 10A:
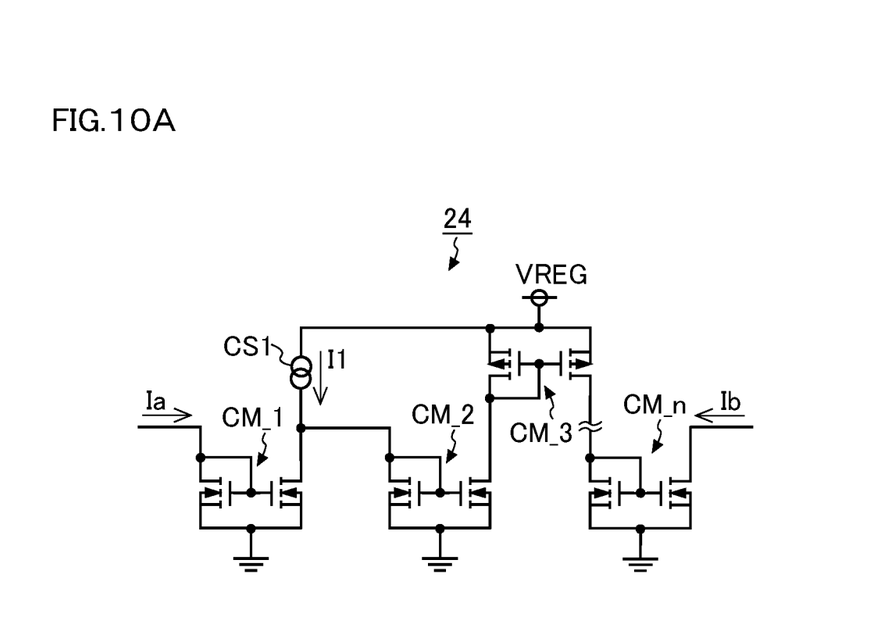
FIG. 10A is a diagram showing one configuration example of a current amplifier used in the linear power supply circuit shown in FIG. 8.

FIG. 10A is a diagram showing one configuration example of the current amplifier 24 used in the linear power supply circuit shown in FIG. 8. The current amplifier 24 includes current-sink current mirror circuits CM_1, CM_2, ... CM_n and current-source current mirror circuits CM_3, ... CM_n−1 (though CM_n−1 is not illustrated in FIG. 10A). Between, at one end, the current-sink current mirror circuit CM_1 and a constant current source CS1 that produces a constant current I1 and, at the other end, the current-sink current mirror circuit CM_n, from the input to the output of the current amplifier 24, the current-sink current mirror circuits and the current-source current mirror circuits arranged alternately. To keep poles occurring in the current mirror circuits as far away as possible from a low-frequency band, the current mirror circuits are preferably each given a mirror ratio (the ratio of the size of the output-side transistor to the size of the input-side transistor) of 5 or less, and more preferably 3 or less. Considering however that, the lower the mirror ratio of a current mirror circuit, the larger the circuit area of the current amplifier 24, the current mirror circuits can each be given a mirror ratio determined with consideration given to the trade off between improved frequency characteristics and compactness.

The linear power supply circuit shown in FIG. 8 may additionally include a feedback circuit 9. The feedback circuit 9 feeds information as mentioned above back to a first predetermined point across a first path from the output of the differential amplifier 21 to the output terminal T2. Specifically, the feedback circuit 9 negatively feeds back to the current amplifier 24 information on the output current IOUT that is fed out via the output terminal T2. Accordingly, the current amplifier 24 outputs the current Ia, which is output from the drain of the PMOSFET 23, and a current Ib based on the just mentioned information.

Figure 10B:
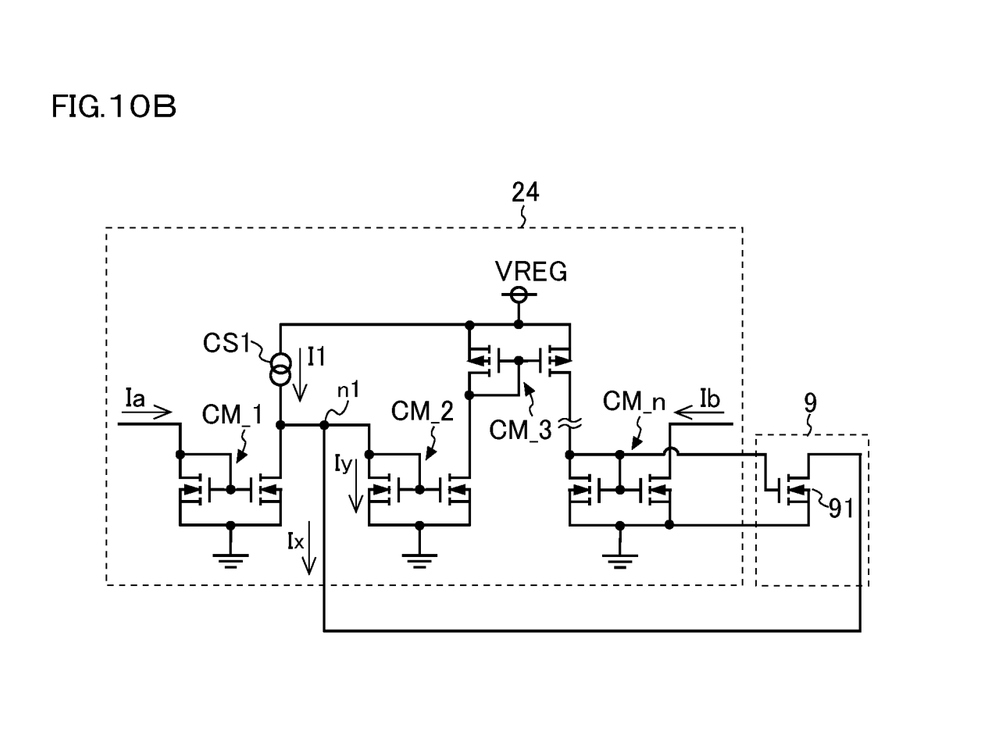
FIG. 10B is a diagram showing one configuration example of a current amplifier and a feedback circuit used in the linear power supply circuit shown in FIG. 8.

In the configuration example shown in FIG. 10B, an NMOSFET 91 that functions as the feedback circuit 9 acquires the above-mentioned information from a second predetermined point across a second path from the input of the differential amplifier 21 to the output terminal T2. The second predetermined point is located closer, than the first predetermined point mentioned above, to the output terminal T2. Specifically the NMOSFET 91 acquires the above information from the current mirror circuit CM_n. In this example, the above information is information on the current Ib. The current mirror circuit that the PMOSFET 25 and the output transistor 1 constitute generates an output current commensurate with the current Ib, and thus the above information is information on the output current IOUT. The NMOSFET 91 feeds the above information back to connection node between the current-sink current mirror circuit CM_1 and the constant current CS1.

The current amplifier 24 and the feedback circuit 9 shown in FIG. 10B function as an overcurrent protection circuit for the linear power supply circuit.

In FIG. 10B, the input of the current-sink current mirror circuit CM_2 is the first predetermined point. In the following description, the first predetermined point is referred to as the connection node n1.

The feedback circuit 9 draws from the connection node n1 a current Ix commensurate with the above information. The current-sink current mirror circuit CM_2 draws from the connection node n1 a current Iy which is the drain current of the input-side transistor in the current-sink current mirror circuit CM_2.

When the current Ia equals zero, the sum current of the currents Ix and Iy is at the maximum. The maximum value of the sum current of the currents Ix and Iy equals a current I1. This gives formula (1):

$$Ix + Iy \leq I1 \quad (1)$$

Since the currents Ix and Iy are both approximately proportional to the current Ib, formula (1) above rearranges to:

$$Ib \leq I1/C \text{ (where } C \text{ is a constant)}$$

Thus, if depending on the state of the load the current Ib tends to increase, it cannot increase beyond a limit. That is, the current Ib is subject to overcurrent protection.

Figure 10C:
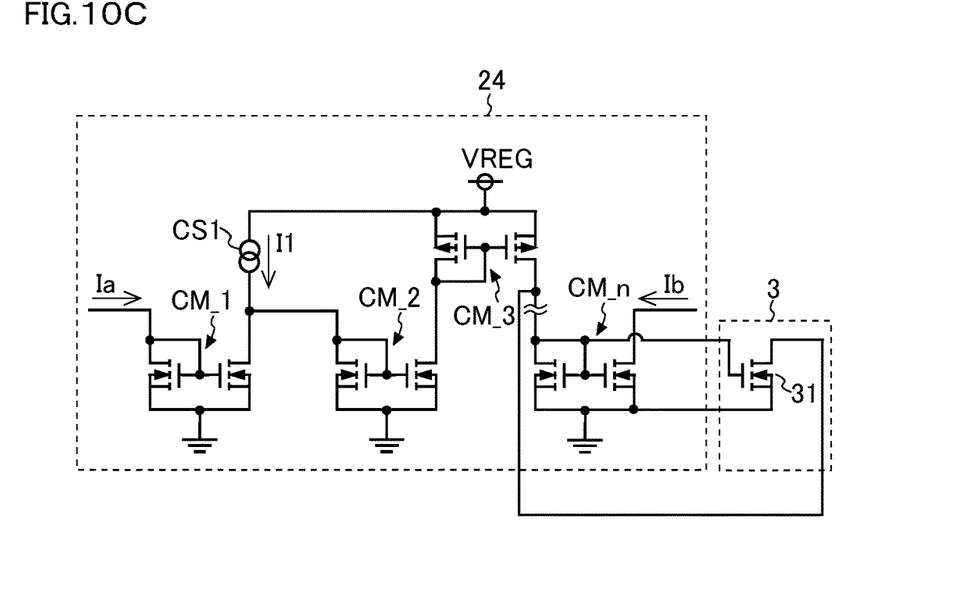
FIG. 10C is a diagram showing another configuration example of a current amplifier and a feedback circuit used in the linear power supply circuit shown in FIG. 8.

The first predetermined point mentioned above may be located closer, than it is shown to be in FIG. 10B, to the output terminal T2. For example, as in the configuration example shown in FIG. 10C, the NMOSFET 91 may feed the above information back to the connection node between the current mirror circuits CM_3 and CM_4 (neither is illustrated in FIG. 10C). The configuration example shown in FIG. 10C, like the configuration example shown in FIG. 10B, functions as an overcurrent protection circuit for the linear power supply circuit.

Figure 10D:
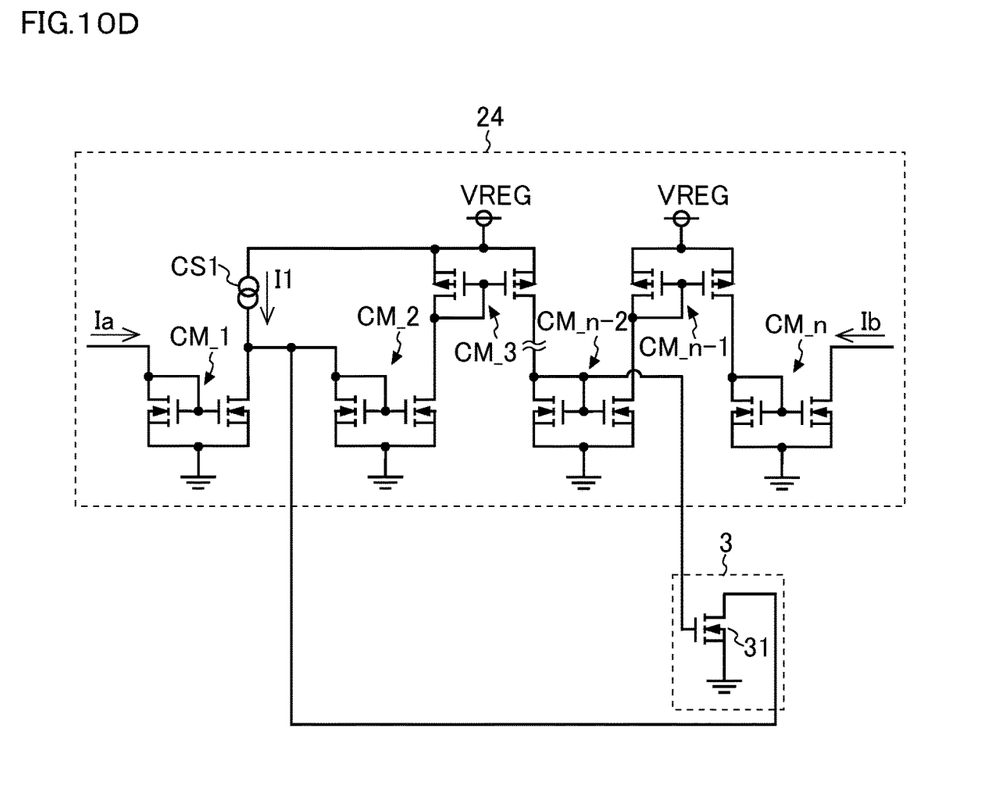
FIG. 10D is a diagram showing yet another configuration example of a current amplifier and a feedback circuit used in the linear power supply circuit shown in FIG. 8.

The second predetermined point mentioned above may be located closer, than it is shown to be in FIG. 10B, to the input of the current amplifier 24. For example, as in the configuration example shown in FIG. 10D, the NMOSFET 91 may acquire the above information from the current mirror circuit CM_n-2. The configuration example shown in FIG. 10D, like the configuration example shown in FIG. 10B, functions as an overcurrent protection circuit for the linear power supply circuit.

6. Application

Figure 11:
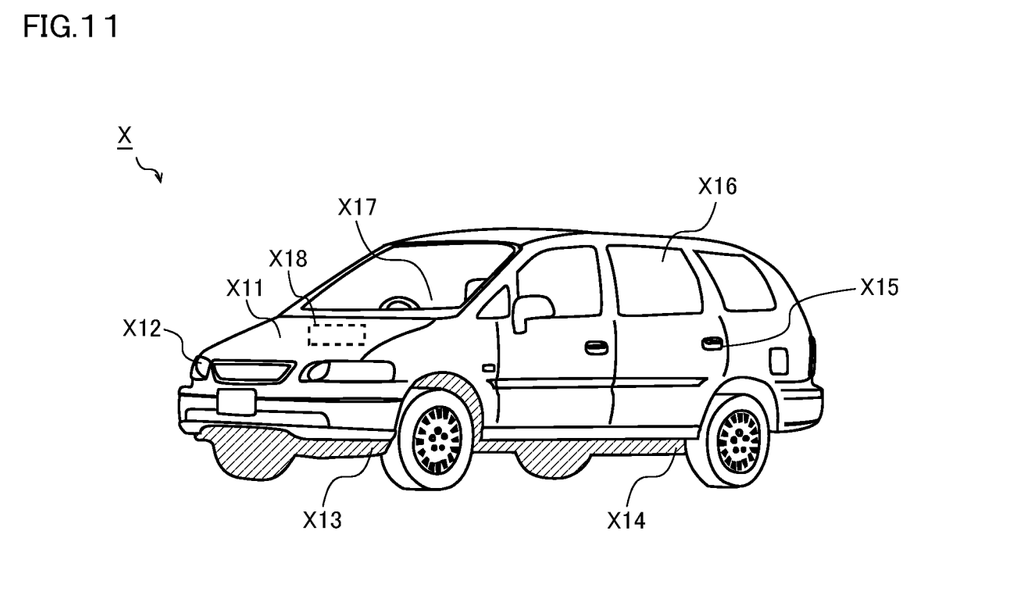
FIG. 11 is an exterior view of a vehicle.

FIG. 11 is an exterior view of a vehicle X. The vehicle X of this configuration example incorporates various electronic appliances X11 to X18 that operate by being fed with a voltage supplied from a battery (not shown). For the sake of convenience, FIG. 11 may not show the electronic appliances X11 to X18 at the places where they are actually arranged.

The electronic appliance X11 is an engine control unit which performs control with respect to an engine (injection control, electronic throttle control, idling control, oxygen sensor heater control, automatic cruise control, etc.).

The electronic appliance X12 is a lamp control unit which controls the lighting and extinguishing of HIDs (high-intensity discharged lamps) and DRLs (daytime running lamps).

The electronic appliance X13 is a transmission control unit which performs control with respect to a transmission.

The electronic appliance X14 is a behavior control unit which performs control with respect to the movement of the vehicle X (ABS [anti-lock brake system] control, EPS (electric power steering) control, electronic suspension control, etc.).

The electronic appliance X15 is a security control unit which drives and controls door locks, burglar alarms, and the like.

The electronic appliance X16 comprises electronic appliances incorporated in the vehicle X as standard or manufacturer-fitted equipment at the stage of factory shipment, such as wipers, power side mirrors, power windows, dampers (shock absorbers), a power sun roof, and power seats.

The electronic appliance X17 comprises electronic appliances fitted to the vehicle X optionally as user-fitted equipment, such as A/V (audio/visual) equipment, a car navigation system, and an ETC (electronic toll control system).

The electronic appliance X18 comprises electronic appliances provided with high-withstand-voltage motors, such as a vehicle-mounted blower, an oil pump, a water pump, and a battery cooling fan.

Any of the linear power supply circuits described previously can be built in any of the electronic appliances X11 to X18.

7. Modifications

The embodiments disclosed herein should be considered to be in every aspect illustrative and not restrictive, and the technical scope of the present invention is defined not by the description of embodiments given above but by the scope of the appended claims and should be understood to encompass any modifications within a spirit and scope equivalent to the claims.

REFERENCE SIGNS LIST 1 output transistor
2 driver
8 generator 9 feedback circuit
21, 21' differential amplifier
22, 22' capacitor
23 PMOSFET (one example of a converter)
23' NMOSFET (another example of a converter)
24 current amplifier
X vehicle

What is claimed is:

1. A linear power supply circuit, comprising:
an output transistor provided between an input terminal to which an input voltage is applied and an output terminal to which an output voltage is applied; and
a driver configured to drive the output transistor based on a division voltage of the output voltage and a reference voltage,
wherein
the driver includes:
a differential amplifier configured to output a voltage commensurate with the difference between the division voltage and the reference voltage;
a capacitor of which one terminal is fed with an output of the differential amplifier and of which another terminal is fed with a ground potential;
a converter configured to convert the voltage based on the output of the differential amplifier into a current to output the current; and
a current amplifier configured to perform current amplification on an output of the converter,
a supply voltage for the differential amplifier and the converter is a voltage that is lower than the output voltage and that depends on the output voltage, and
the differential amplifier has a gain lower than a gain of the current amplifier.

2. The linear power supply circuit according to claim 1, wherein the division voltage is lower than the supply voltage for the differential amplifier and the converter.

3. The linear power supply circuit according to claim 1, wherein the differential amplifier and the converter have a withstand voltage lower than the output voltage.

4. The linear power supply circuit according to claim 1, wherein a supply voltage for the current amplifier is a constant voltage.

5. The linear power supply circuit according to claim 1, further comprising:
a generator configured to generate the supply voltage for the differential amplifier and the converter from the output voltage,
wherein the generator includes a high-impedance-input element.

6. The linear power supply circuit according to claim 5, wherein the element has a withstand voltage equal to or higher than the output voltage, and a part of the generator except the element has a withstand voltage lower than the output voltage.

7. The linear power supply circuit according to claim 1, further comprising:
a feedback circuit configured to feed back, to the current amplifier, information on an output current output from the output terminal,
wherein
the driver is configured to drive the output transistor based on:
the difference between the division voltage of the output terminal and the reference voltage, and
the information,
the feedback circuit is configured:
to feed the information back to a first predetermined point across a first path from the output of the differential amplifier to the output terminal, and
to acquire the information from a second predetermined point across a second path from an input of the current amplifier to the output terminal,
the second predetermined point is located closer than the first predetermined point to the output terminal,
the current amplifier includes a plurality of current-sink current mirror circuits and a plurality of current-source current mirror circuits,
an input of one of the current-sink current mirror circuits is the first predetermined point,
the feedback circuit is configured to draw from the first predetermined point a current commensurate with the information, and
a sum current of:
the current drawn from the first predetermined point by the feedback circuit, and
a current drawn from the first predetermined point by the current-sink current mirror circuit of which the input is the first predetermined point has a maximum value that does not depend on the output of the converter.

8. The linear power supply circuit according to claim 4, wherein the differential amplifier and the converter have a withstand voltage lower than a withstand voltage of the current amplifier.

9. The linear power supply circuit according to claim 1, wherein:
the current amplifier includes a plurality of current-sink current mirror circuits and a plurality of current-source current mirror circuits,
the current-sink current mirror circuits each have a mirror ratio of 5 or less, and
the current-source current mirror circuits each have a mirror ratio of 5 or less.

10. A vehicle, comprising:
the linear power supply circuit according to claim 1.

11. A linear power supply circuit, comprising:
an output transistor provided between an input terminal to which an input voltage is applied and an output terminal to which an output voltage is applied; and
a driver configured to drive the output transistor based on a division voltage of the output voltage and a reference voltage,
wherein
the driver includes:
a differential amplifier configured to output a voltage commensurate with the difference between the division voltage and the reference voltage;
a capacitor of which one terminal is fed with an output of the differential amplifier and of which another terminal is fed with a ground potential;
a converter configured to convert the voltage based on the output of the differential amplifier into a current to output the current; and
a current amplifier configured to perform current amplification on an output of the converter, and
a supply voltage for the differential amplifier and the converter is a voltage that is lower than the output voltage and that depends on the output voltage,
wherein a supply voltage for the current amplifier is a constant voltage, and
wherein the differential amplifier and the converter have a withstand voltage lower than a withstand voltage of the current amplifier.

12. A linear power supply circuit, comprising:
an output transistor provided between an input terminal to which an input voltage is applied and an output terminal to which an output voltage is applied; and
a driver configured to drive the output transistor based on a division voltage of the output voltage and a reference voltage,
wherein
the driver includes:
   a differential amplifier configured to output a voltage commensurate with the difference between the division voltage and the reference voltage;
   a capacitor of which one terminal is fed with an output of the differential amplifier and of which another terminal is fed with a ground potential;
   a converter configured to convert the voltage based on the output of the differential amplifier into a current to output the current; and
   a current amplifier configured to perform current amplification on an output of the converter, and
a supply voltage for the differential amplifier and the converter is a voltage that is lower than the output voltage and that depends on the output voltage,
wherein:
the current amplifier includes a plurality of current-sink current mirror circuits and a plurality of current-source current mirror circuits,
each of the current-sink current mirror circuits has a mirror ratio of 5 or less, and
each of the current-source current mirror circuits has a mirror ratio of 5 or less.

* * * * *